3,194,428
COATED BLACK PLATE CONTAINERS
John E. Dereich, Pittsburgh, Pa., assignor to Neville Chemical Company, Pittsburgh, Pa., a corporation of Pennsylvania
No Drawing. Filed Jan. 29, 1962, Ser. No. 169,632
7 Claims. (Cl. 220—64)

This invention relates to a method for lining containers such as metal cans particularly those used in the food industry, and collapsible metal tubes or specialty medicines, tooth paste, and the like, and to the lined container.

At the present time metal cans and similar containers for food and beverage products, other than glass containers and certain types of plastic container are made of metal. The more common of these are the so-called tin cans which are usually made of tin coated black iron sheet. In recent years more and more containers are being made of other metals such as aluminum, magnesium, and their alloys.

For many purposes, however, the tin cans are not sufficently resistant to corrosion or other action of food products, and may cause discoloration or change of flavor, or both, of the contents, As a consequence linings are used which prevent direct contact between the contents and the metallic surfaces.

At present three categories of linings are employed in the food industry. These are sanitary, "C" enamel, and citrus. Sanitary linings are used where the acid content of the food is low, "C" enamels are used to prevent sulfite staining characteristics of food such as meat, fish, and soups. The citrus linings are used for concentrated fruit juices and other beverages. In certain instances two different layers of coating material are employed. For example, in the lining of aluminum cans an oleoresinous base coat is used with a vinyl resin top coat.

As a rule, metal food containers are fabricated from tin plate which has been coated on one or both sides with a coating, the amount of the coating varying from about four to about six milligrams per square inch. The coatings are applied by a number of different methods such as dipping, roller-coating, or spraying and the like. The coating material is usually a solution of film forming resin compounded with various plasticizers, driers and other ingredients well known to the trade. The solvent is evaporated and recovered. The coating is then baked in a curing oven, usually for a period of ten to fifteen minutes, more or less depending upon the temperature used. For oleoresinous linings temperatures of 400–425° F. are employed. For other resins, the temperature and time employed may vary. This in turn may depend upon the heat resistance of both the substrate and the coating material used.

As a rule, water soluble and water emulsifiable resin coatings have not met with much success for lining containers, although for certain limited applications they may be useful. Oleoresinous compositions, ethoxylene lacquers, certain diene polymers and copolymers, polyacrylates, polyvinyl compounds and thermosetting phenolic resins have been used as solutions and in water emulsion as coating materials generally, and at times for coating containers such as are contemplated here.

However, none of these have achieved the requirements for a "universal" coating which has long been sought after in the food industries. Each of the compounds mentioned above has merit for certain specific applications but they have limitations. As a consequence the container manufacturer must inventory a rather large number of coating compositions each of which can be used for a specific purpose. The containers are lined with these according to the use to which the can is to be put.

A polybutadiene resin available in about 50% solids solution in mineral spirits has been found perhaps to have a greater scope of utility than any other particular individual lining composition. This, however, still presents the problem of removal and recovery of the solvent. Both from the standpoint of economics and of safety, it would be desirable to use something other than a solution of this type. Another problem frequently encountered with coatings applied in the form of solutions, resides in the incomplete removal of the solvent, for example, where the heating procedure is imperfect. This may result in coating failure. Also there may be residual flavor or odor from the solvent, even when removal is seemingly complete.

Many latex type coatings having a water base are susceptible to attack by acid and may impart a different and undesirable taste to a food product. Certain thermosetting acrylic polymers impart a disagreeable taste to certain foods and are difficult to cure to a sufficiently hard coating. Some epoxy resins produce excellent coatings but are not sufficiently moisture resistant under processing conditions.

In one specific embodiment, the present invention comprises a process for coating metal containers as well as to the containers themselves. This overcomes the objections to present coatings and methods of coating containers for food and beverage products such as meats, soups, fish, fowl, fruits and juices, beer, ale, etc. It comprises applying to the container or to the metal sheet from which the container is to be made, one or more coats of an aqueous dispersion of a copolymer of tetrafluoroethylene and hexafluoropropylene, the coating being baked or otherwise heated to the fusion point or incipient fusion point of the coating material between applications of the coatings. Ordinarily two coatings are adequate. Where the sheet is coated, the container is formed after coating, by known methods.

Polymers of tetrafluoroethylene are highly resistant to corrosion but offer such a weak bond to metal surfaces that the coated material cannot be formed into cans or other containers without destroying the film. The copolymers of tetrafluoroethylene with hexafluoropropylene have the advantage of forming a sufficiently strong bond that the containers may be formed by the usual methods without destroying the coating, and the tops can be applied after the container has been filled in such a manner as to form a continuous attack-resistant coating within the can.

The copolymers of this invention may be made by the method described in United States Patent 2,549,935. They comprise 5–50% by weight of hexafluoropropylene (preferably 5–15%) and 95–50% by weight of tetrafluoroethylene (preferably 95–85%), copolymerized, to form normally solid resins which melt 20–250° F., and preferably 100–250° F., below polytetrafluoroethylene homopolymers.

The coating material is made by dispersing particles of the copolymer in an aqueous medium which may contain from 50% to 60% of the copolymer. The particles may be of a particle size of about 0.1 to 3 microns, and preferably about 0.1 to about 0.25 micron. From 5% to 7% of mixed anionic and non-ionic wetting agents based upon the solids content is added and the pH of the resultant suspension is approximately 10. While there may be some tendency to settle, agitation of the mixture resuspends the solids. If desired, coloring materials such as pigments may be added to the water dispersion. It is also possible to further reduce the particle size of the copolymer by appropriate milling methods. This has the advantage that the dispersions are more stable and the resultant coating may be more uniform. One of the disadvantages of coatings based upon aqueous dispersions has been the tendency to develop pinpoint imperfections which permit contact between the metal substrate and the contents and may result in undesirable effects, particularly after the product has been stored on the shelf for long periods of time. Pinpoints can be overcome largely by applying one coat of the material, curing it and then applying and curing a second coat. This tends to seal over any pinpoints or other defects that may have developed.

Polyhalocarbon waxes may be incorporated in the dispersions. These may aid in providing more perfect coatings. They may volatilize at the curing temperature.

The curing temperatures of the coating are in general higher than those which are used with other types of presently used coating materials for food containers. The copolymer employed in this invention may be cured at a temperature of about 575° F. to about 625° F. depending upon the exact composition of the copolymer and its fusing point. Polytetrafluoroethylene has a much higher fusion point, usually from about 700–750° F., while those used in this invention preferably fuse or sinter at temperatures 100–250° F. lower.

Because of the higher temperature employed, the curing time employing the present copolymer dispersions may be considerably decreased from those now employed, for example, being from about one to five minutes or less, resulting in increased production rates, lower processing costs and smaller oven space for a given plant capacity. This offsets the present somewhat higher materials cost of the resin. Before curing the coated substrate is dried at a temperature and for a time such that blistering of the coating does not occur. The time required for drying is short, but too rapid drying may be detrimental, particularly if the heat is not uniformly applied. The usual drying methods may be used such as passing the coated material through a tunnel drier and then into a tunnel heater for curing. The coated metal may be used at once after cooling for forming the containers or may be rolled into rolls in the usual way for use at a later time.

Alternatively, the dried coated container may be flame-treated to fuse the coating. This has the advantage of even greater saving of time. The article may be passed through the high-temperature flame, or the flame passed over it. The coating fuses without bringing the entire substrate to the fusion temperature. Induction heating or high radiant heat may be used in which the total exposure is a fraction of a minute.

In addition to the use of metals such as aluminum or tin plate, it is possible to use thin steel such as the "black plate" employed in making tin plate for the ordinary containers. When black plate is used instead of tin plate the metal may be Bonderized or phosphitized immediately prior to application of the dispersion. All oil, scale, and the like must be removed prior to application of the coating. Since the steel tends to oxidize, particularly in the presence of water, it is desirable to heat the coating to remove water immediately after the coating has been applied. Oxidation of the surface reduces the bond strength. The metal surface may be sand-blasted prior to coating to improve bond.

The use of "black plate" offers many attractive features. The idea of coating black plate for food containers is not new but has heretofore not been done without the intermediate tin plating because of shortcomings of previous coatings. Tin is frequently in short supply, especially in times of national emergency, hence this invention tends to alleviate this situation. If desired the container could be tin coated on the outside, and coated with the copolymer of this invention on the inside.

Since the copolymer coatings ordinarily are no more than about 0.05 to 2.0 and preferably 0.1 to 1.0 mil in thickness the removal of water is quite rapid. Hence the coated metal can be dried and cured in a short time, usually less than five minutes and frequently not more than two to three minutes. By some methods such as flame treatment, induction heating and high temperature radiant heating may be sometimes carried out in a matter of seconds.

The copolymers are not readily susceptible to printing inks. Consequently it is preferred both as an economy measure and for the relatively poor acceptance of printing inks to coat only one side of the metal with the copolymers. The outerside may be coated with a different lacquer or coating which will readily accept printing or lithographing, or may be tin plated. While it is preferred to apply the lacquer coating to phosphatized, Bonderized, or passivated black plate, the coating may also be applied to previously tin coated metal.

Black plate, i.e., ordinary steel plate of a thickness common for metal containers, may be coated with a resin dispersion of a copolymer of say 88% tetrafluoroethylene, and 12% hexafluoropropylene having approximately 55% solids in aqueous dispersion. The dispersion contains about 5–7% of mixed anionic an non-ionic wetting agents which are volatilizable at the curing temperature of 500° F. or higher. The pH may be about 10 and the particle size of the copolymer about 0.1 to about 0.25 micron. The viscosity of the dispersion may be about 25 centipoises. The melting point of the copolymer is about 545° F. to 563° F.

The coating may be rolled on to the metal sheet (steel, tin plate, aluminum, etc.) and immediately passed first through a drying oven held at a temperature of about 250° F. to remove most of the water, and then into a curing oven at a temperature of about 575–600° F. for a period of approximately two minutes. The sheet may then be cooled and a second coat applied, being dried and cured in the same fashion. Containers may be made from the coated material by known methods. They are resistant to indefinite contact with a wide variety of substances including orange juice, soups, vegetable juices, meats, fish, cooked vegetables and the like, without discoloration, corrosion, or imparting of foreign taste to the contents.

Food containers for use as aerosol dispensers, i.e., pressurized with known non-toxic propellants such as carbon dioxide, nitrous oxide, suitable halogenated hydrocarbons such as Freons or Genetrons, etc. and other suitable propellants may advantageously be lined with the composition of this invention. Many presently used coatings are unsuitable for this use because they are attacked by the propellants. The lined containers are not attacked by either the food or the propellant.

It is also within the scope of the invention to form plastisols of the copolymer in liquid or semiliquid form, and to coat the container, followed by fusing the film. The film may be rolled, brushed or sprayed onto the surface, and then heated. Another method is to flame-spray the plastisol onto the substrate before or after forming the container.

While the invention has been described with particular reference to metal cans, it is applicable to any type of container in which the substrate is attacked by the contents. This may include containers having removable or press-fit covers, such as refrigerator dishes, or collapsible tubes used in the food, pharmaceutical and cosmetic industries. Many such tubes are made of metals including aluminum, zinc and zinc alloys.

I claim as my invention:

1. A metal storage container resistant to the effects of foods and beverages wherein said metal comprises a black plate substrate having fused directly to the interior thereof a thin coating of a copolymer of tetrafluoroethylene and hexafluoropropylene.

2. A metal storage container resistant to the effects of foods and beverages wherein said metal comprises a black plate substrate having fused directly to the interior thereof a coating of a copolymer comprising about 5 to 50 per- by weight of combined hexafluoropropylene and about 95 to 50 percent by weight of combined tetrafluoroethylene, said coating having a thickness of about 0.05 to 2.0 mils.

3. A steel can for storing foods and beverages which comprises a black plate substrate having fused directly to the interior thereof a coating of a copolymer comprising about 5 to 15 percent by weight of combined hexafluoropropylene and about 95 to 85 percent by weight of combined tetrafluoroethylene, said coating having a thickness of about 0.1 to 1.0 mil.

4. A process for coating a storage container for foods, beverages and the like which comprises providing directly on the interior of a container formed from black plate a thin film of a copolymer of tertafluoroethylene and hexafluoropropylene, and sintering the coating above its fusion point at a temperature above about 500° F. and up to about 625° F.

5. A proces according to claim 4 wherein the copolymer film is applied as an aqueous dispersion of solid particles of a copylmer comprising from 5 to 50 percent by weight of combined hexafluoropropylene and about 95 to 50 percent by weight of combined tetrafluoroethylene, and the film fused at a curing temperature between 575° and 625° F. so as to form a coating of about 0.05 to 2.0 mils in thickness.

6. A process for forming a storage container for foods, beverages and the like which comprises coating a black plate substrate directly with a thin film of a copolymer of tetrafluoroethylene and hexafluoropropylene, fusing the film and forming the storage container with the coated surface on the interior.

7. A process according to claim 6 wherein the copolymer film is applied as an aqueous dispersion of solid particles of a copolymer composed of from about 5 to 15 percent by weight of combined hexafluoropropylene and about 95 to 85 percent by weight of combined tetrafluoroethylene, and the film fused at a curing temperature between 575° and 625° F. so as to form a coating having a thickness of about 0.1 to 1.0 mil.

References Cited by the Examiner
UNITED STATES PATENTS

| | | | |
|---|---|---|---|
| 2,378,446 | 4/45 | Soday | 117—75 |
| 2,549,935 | 4/51 | Sauer | 260—87.5 |
| 2,788,306 | 4/57 | Cox et al. | 161—204 X |
| 2,885,293 | 5/59 | Haskell et al. | 99—187 |
| 3,008,601 | 11/61 | Cahne | 117—97 X |
| 3,062,793 | 11/62 | Eleuterio | 260—87.5 |

OTHER REFERENCES

"Flurocarbons," by Rudner, pub. 1958 by Reinhold Pub. Corp., pp. 223 to 227.

RICHARD D. NEVIUS, *Primary Examiner.*